(12) United States Patent
Genkin et al.

(10) Patent No.: US 7,919,057 B2
(45) Date of Patent: Apr. 5, 2011

(54) METHOD AND APPARATUS FOR PRODUCING A HYDROGEN-CONTAINING GAS

(75) Inventors: Eugene S. Genkin, Allentown, PA (US); Nitin Madhubhai Patel, Allentown, PA (US); Gregory David Snyder, Macungie, PA (US); Miguel Rafael Alvarez, Whitehall, PA (US); Vladimir Yliy Gershtein, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 343 days.

(21) Appl. No.: 12/335,129

(22) Filed: Dec. 15, 2008

(65) Prior Publication Data

US 2009/0094894 A1    Apr. 16, 2009

Related U.S. Application Data (63) Continuation-in-part of application No. 11/220,079, filed on Sep. 6, 2005, now abandoned.

(51) Int. Cl.
 *B01J 19/00* (2006.01)
 *B01J 10/00* (2006.01)
 *C01B 3/26* (2006.01)

(52) U.S. Cl. ........ 422/198; 422/625; 422/630; 422/200; 48/197 R; 48/198.7; 48/127.7; 423/650; 423/651; 423/652

(58) Field of Classification Search ............... 422/189, 422/196, 197, 198, 200; 48/197 R, 198.7; 48/127.7; 423/650, 651, 652
See application file for complete search history.

(56) References Cited

U.S. PATENT DOCUMENTS

| | | |
|---|---|---|
| 5,264,202 A | 11/1993 | Snyder |
| 6,818,028 B2 | 11/2004 | Barnett et al. |
| 6,981,994 B2 | 1/2006 | Drnevich et al. |
| 2005/0176831 A1 | 8/2005 | Inui et al. |

FOREIGN PATENT DOCUMENTS

EP    1069070 A2    12/2008

OTHER PUBLICATIONS

Farnell, P.W., "Pre-Reforming A Retrofit Case Study" ICI Katalco, Paper 4, Presented at IMTOF '95, San Francisco, Jun. 1995.

*Primary Examiner* — Walter D Griffin
*Assistant Examiner* — Lessanework Seifu
(74) *Attorney, Agent, or Firm* — Bryan C. Hoke, Jr.

(57) ABSTRACT

A process and apparatus for producing a hydrogen-containing gas in a reformer where a furnace, which is independent of the reformer, heats the effluent from a prereformer prior to reacting the prereformer effluent in the reformer. The prereformer effluent may be heated in a heat exchange tube in the furnace where the heat exchange tube is positioned in the furnace to preclude direct radiation from any flames in the furnace thereby preventing local overheating of the heat exchange tube and preventing carbon formation in the heat exchange tube. Fuel and oxidant gas may be introduced into the furnace with significant excess oxidant gas, having a stoichiometric ratio of 1.8 to 2.8 for controlling the temperature of the heat exchange tube.

10 Claims, 4 Drawing Sheets

Prior art

FIG. 4

METHOD AND APPARATUS FOR PRODUCING A HYDROGEN-CONTAINING GAS

CROSS-REFERENCE TO RELATED APPLICATIONS

This application is a continuation-in-part of U.S. patent application Ser. No. 11/220,079, filed Sep. 6, 2005, the specification and claims which are incorporated by reference and made a part of this application.

BACKGROUND OF THE INVENTION

In hydrocarbon reforming, a hydrocarbon feedstock and steam are reacted catalytically in a reformer furnace to form a synthesis gas comprising hydrogen and carbon monoxide. The reforming furnace is a critical component of hydrogen production facilities and plants which use synthesis gas to produce methanol and ammonia, and can account for almost half of the operating costs and energy expenditures of such installations.

A typical reforming furnace comprises a fired radiant section, a transition section, and a convection section. Tubes filled with a reforming catalyst, i.e. reformer tubes, are disposed in the radiant section. The reforming catalyst is typically nickel on an alumina support. A hydrocarbon feedstock and steam are fed through and reformed in the reformer tubes. Combustion of a fuel in the radiant section produces a hot flue gas which heats the reformer tubes and provides the thermal energy necessary for the endothermic reforming reaction. The transition section receives hot flue gas from the radiant section and passes it to the convection section. One or more heating coils disposed in the convection section may be used for different preheat purposes, including preheating the hydrocarbon feedstock and steam before that feed stream is reformed in the reformer tubes. Flue gas from the transition section heats the convection section coils.

The overall efficiency of a reforming furnace is affected by the absorbed heat duty of the reformer tubes. In general, greater reformer tube heat duties require increased temperatures and firing rates in the radiant section. Operating the radiant section in this way requires increased maintenance and shortens the reformer tubes useful life. Increasing the heat duty provided by the radiant section can also lead to coke formation in the reformer tubes.

Maximizing the temperature of the hydrocarbon feedstock and steam at the inlet of the radiant section catalyst tubes (the "preheat temperature") improves reformer efficiency. At higher preheat temperatures, the reforming reaction is initiated closer to the inlet of the catalyst tubes, which improves the efficiency of the reforming reaction.

Figure 1:
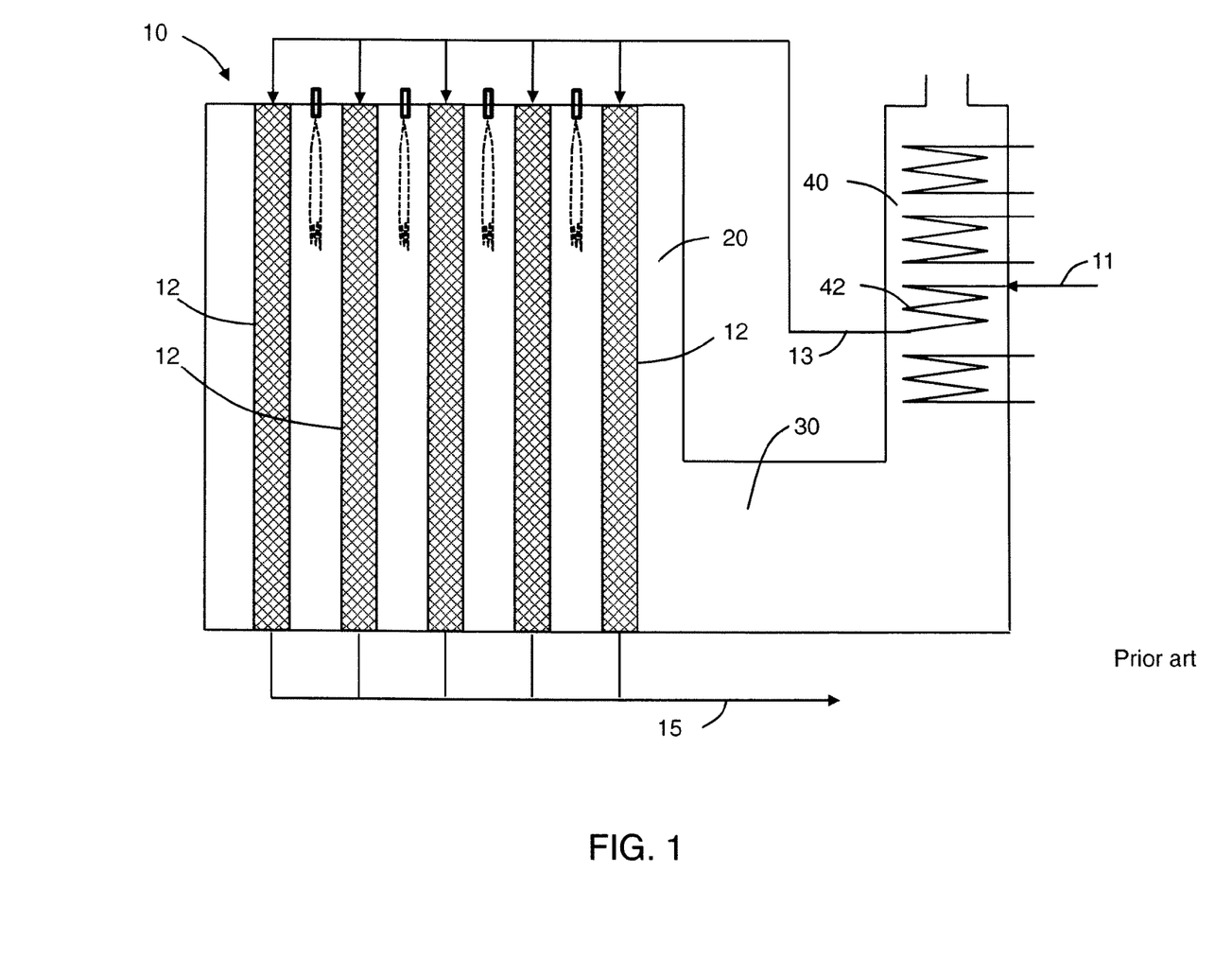
FIG. 1 illustrates a process flow diagram for a conventional reforming process, as described above.

FIG. 1 illustrates a conventional reforming process in which a mixed feed 11 comprising a hydrocarbon feedstock and steam is preheated in heat exchange tube 42 in the convection section 40 of the reformer 10. Preheated mixed feed 13 then flows through reformer tubes 12 located in radiant section 20 to form a synthesis gas product stream 15. Fuel is combusted in the radiant section 20 of the reformer, external to the reformer tubes, to provide heat for the reforming reaction. A combustion product gas mixture is withdrawn from the radiant section and passed to the transition section 30 and subsequently passed to the convection section 40. Synthesis gas product stream 15 is collected at the outlet end of the reformer tubes and is supplied to a customer after additional purification. A conventional reforming process such as that illustrated in FIG. 1 can only achieve a preheat temperature of around 500° C. to around 600° C. due to the risk of carbon formation from the heavy hydrocarbons present in the feedstock.

Figure 2:
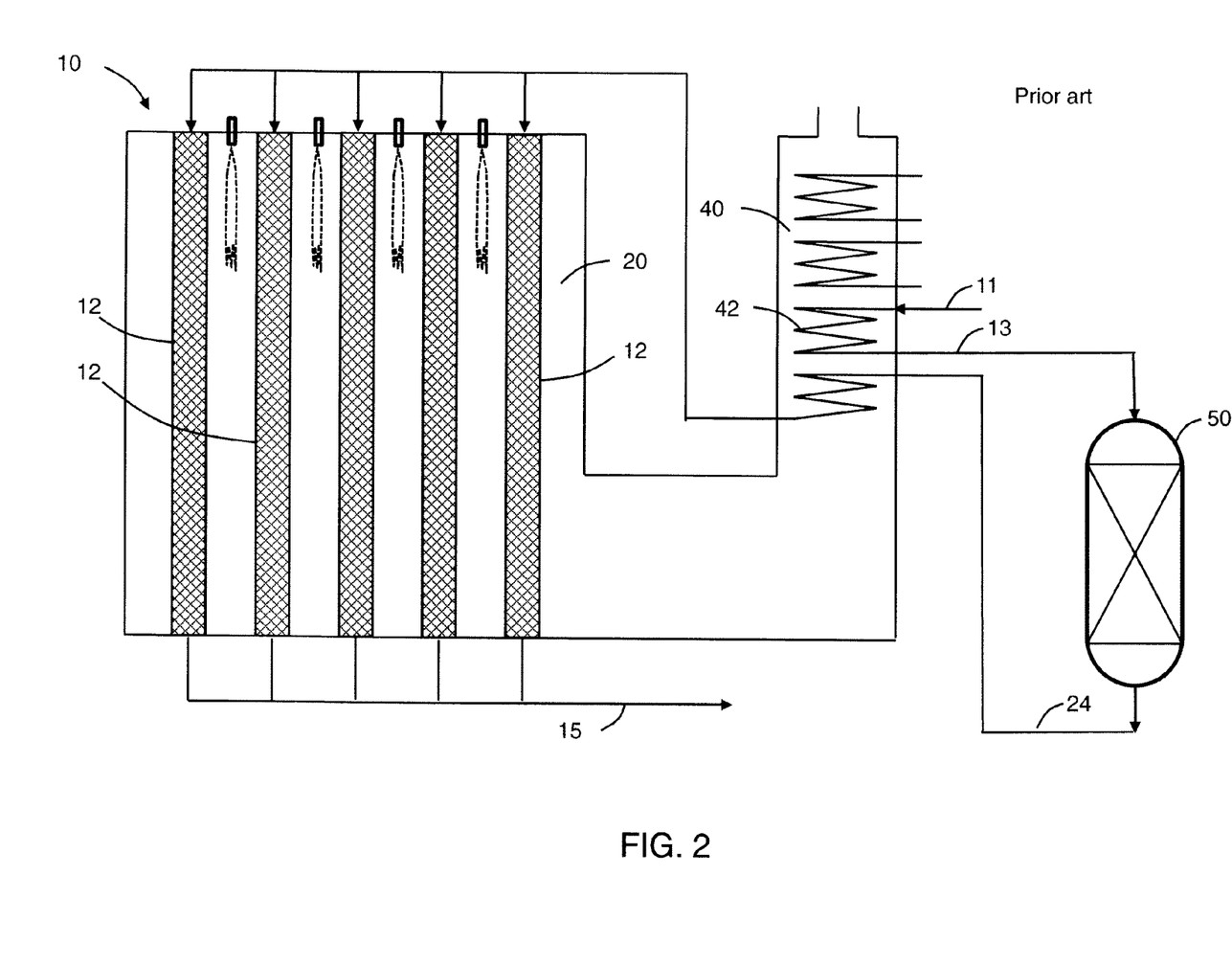
FIG. 2 illustrates a process flow diagram for a conventional reforming process that employs adiabatic prereforming, as described above.

A reduction in radiant section heat load can be achieved by reforming a portion of the higher hydrocarbons in the hydrocarbon feedstock in a prereformer prior to feeding the mixed feed to the reformer tubes. Partially reforming the hydrocarbon feedstock and steam prior to introducing the mixture into the primary reformer tubes is known in the art as "prereforming." This approach is illustrated in FIG. 2 and in U.S. Pat. No. 5,264,202. Referring to FIG. 2, a mixed feed 11 of a hydrocarbon feedstock and steam is preheated in heat exchange tube 42 in the convection section 40 of reformer 10 to form preheated mixed feed 13 which is fed to prereformer 50. Prereformer effluent stream 24 may be heated to a reheat temperature of around 680° C. in convection section 40 prior to being fed to the inlet of reformer tubes 12 in radiant section 20 of reformer 10. Synthesis gas product stream 15 is collected at the outlet end of the reformer tubes.

Figure 3:
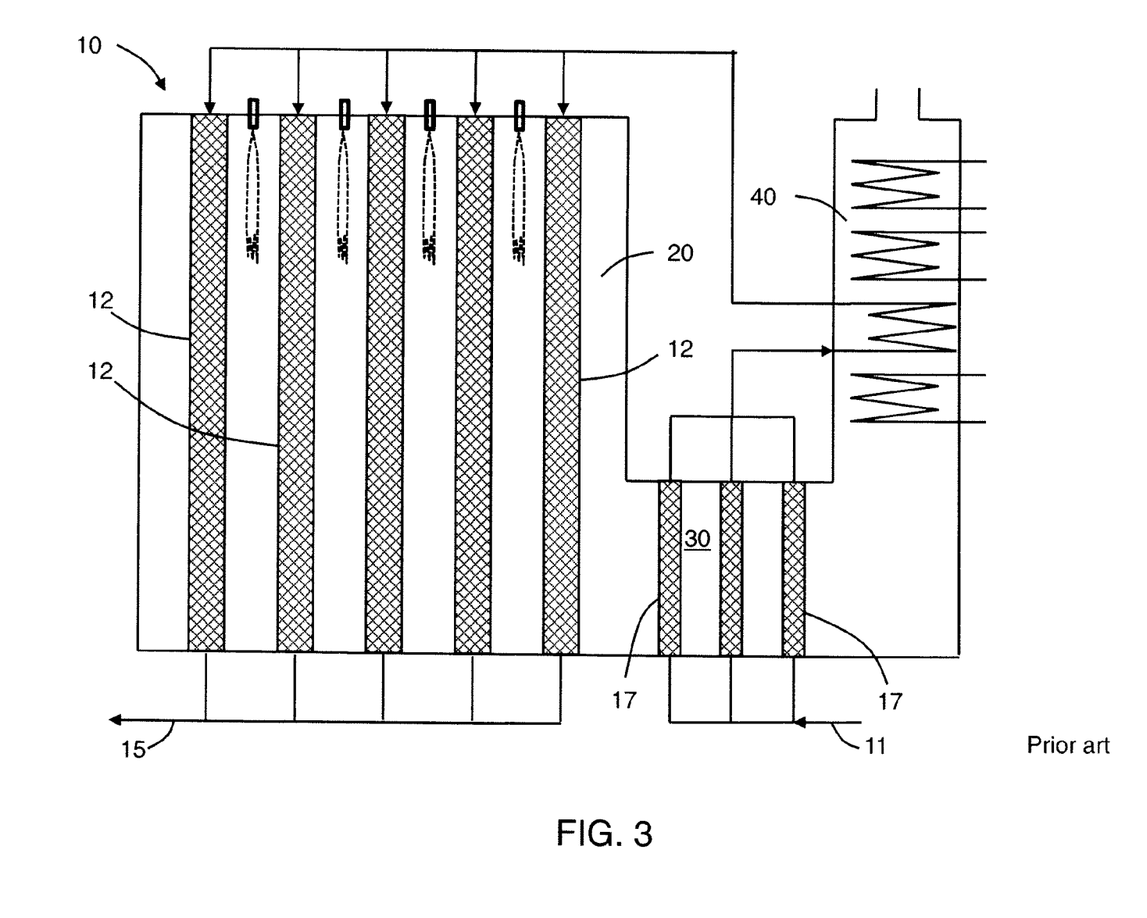
FIG. 3 illustrates a process flow diagram for a conventional reforming process that employs transition/convection section prereforming, as described above.

FIG. 3 illustrates a variant of the process of FIG. 2 in which prereformer tubes 17 are positioned within the reformer transition section 30. In the process illustrated in FIG. 3, a mixed feed 11 comprising a hydrocarbon feedstock and steam is fed to prereformer tubes 17. Effluent from the prereformer tubes is passed to heat exchange tubes positioned in the convection section 40 of the reformer 10 and heated to a reheat temperature. The prereformed mixed feed is then fed at the reheat temperature to reformer tubes 12. Prereforming within a convection/transition section prereformer is also described in U.S. Pat. No. 6,818,028. In general, prereforming proves useful for reforming a natural gas feed as a means to reduce steam generation or primary reformer duty and in instances where the conversion from one feedstock to another is required.

The preheat and prereforming process designs described above prove unsuitable for expanding the production capacity of an existing reformer above around 25% of existing capacity because they are constrained by the energy available in the flue gas, the radiant section firing duty, convection section space limitations, and the overall plant heat balance.

Heat exchange tubes in the reformer convection section which carry effluent from the prereformer tubes are typically exposed to reformer section radiant heat and a varying radiant section flue gas temperature. This makes it difficult to regulate the reheat temperature of the prereformed gas.

Installation of a prereformer in the transition section of an existing reformer is very expensive. The reformer must be taken off-line, thereby disrupting the output of all associated facilities. Limited space in the convection section often precludes installation of an adequately-sized prereformer. Further, the convection section coil design may interfere with the positioning of prereformer tubes in the convection section.

These problems can be compounded by the fact that heat in the flue gas coming from the reformer radiant section may be inadequate to heat both the convection section coils and the prereformer tubes. In such cases, installing a prereformer in the convection section could disrupt the energy balance of the reformer and all associated plants. An "associated plant" is any facility that receives or uses hydrogen-containing product gas produced by a reformer.

Major changes to all of the convection coils downstream of the prereformer might also be required.

Accordingly, the need exists for a cost-effective process which expands the production capacity of an existing reformer through preheat and prereforming without disrupting the output or energy balance of the either the reformer or any associated plant.

BRIEF SUMMARY OF THE INVENTION

The present invention relates to a process and apparatus for producing a hydrogen-containing gas.

The process comprises combusting a first fuel and a first oxidant gas external to a plurality of reformer tubes in a first section of a reformer to form a first combustion product gas mixture and heat the plurality of reformer tubes, reacting a heated feed comprising a hydrocarbon feedstock and steam in an adiabatic reactor containing a reforming catalyst under reaction conditions sufficient to form an intermediate product gas mixture, combusting a second fuel and a second oxidant gas in a furnace thereby forming a flame and generating a second combustion product gas mixture, heating the intermediate product gas mixture in the furnace to form a heated intermediate product gas mixture by indirectly transferring heat between the second combustion product gas mixture and the intermediate product gas mixture, and reacting the heated intermediate product gas mixture in the plurality of reformer tubes under reaction conditions sufficient to form the hydrogen-containing gas, wherein the step of heating the intermediate product gas mixture does not comprise indirectly transferring heat between the first combustion product gas mixture and the intermediate product gas mixture.

The heated intermediate product gas mixture may not be further heated at all between the step of heating the intermediate product gas mixture in the furnace and the step of reacting the heated intermediate product gas mixture in the plurality of reformer tubes.

In the step of heating the intermediate product gas mixture, the intermediate product gas mixture may be heated in a heat exchange tube in the furnace and the heat exchange tube may be located so that heat is not be transferred to the heat exchange tube by direct radiation from the flame.

The process may further comprise heating a feed by indirect heat transfer from the first combustion product gas mixture to the feed to form the heated feed.

The process may further comprise heating a feed by indirect heat transfer from the first combustion product gas mixture and subsequently by indirect heat transfer from the second combustion product gas mixture to form the heated feed.

The second fuel and the second oxidant gas may be introduced into the furnace with a stoichiometric ratio, S, of 1.8 to 2.8.

The heated intermediate product gas mixture may have a temperature ranging from 600° C. to 700° C. or ranging from 680° C. to 700° C.

The apparatus comprises a reformer having a first section containing reformer tubes, the reformer tubes in downstream fluid flow communication of an inlet manifold, the reformer tubes feeding an outlet manifold, an adiabatic reactor containing a reforming catalyst, the adiabatic reactor having an inlet and an outlet, and a furnace having a burner and an exhaust, the furnace containing a first heat exchange tube having an inlet and an outlet, the inlet of the first heat exchange tube in downstream fluid flow communication with the outlet of the adiabatic reactor and the outlet of the first heat exchange tube in upstream fluid flow communication with the inlet manifold of the reformer tubes, wherein there is no intervening heat exchanger between the outlet of the first heat exchange tube and the inlet manifold of the reformer tubes.

The first heat exchange tube may be located in the furnace to preclude direct radiation from a flame generated by the burner.

The reformer may have a second section containing a second heat exchange tube, the second heat exchange tube having an inlet and an outlet, wherein the inlet of the adiabatic reactor is in downstream fluid flow communication with the outlet of the second heat exchange tube.

The furnace may contain a third heat exchange tube having an inlet and an outlet, wherein the inlet of the third heat exchange tube is in downstream fluid flow communication with the outlet of the second heat exchange tube and wherein the inlet of the adiabatic reactor is in downstream fluid flow communication with the outlet of the third heat exchange tube.

DETAILED DESCRIPTION OF THE INVENTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

The term "plurality" means "at least two."

For the purposes of simplicity and clarity, detailed descriptions of well-known devices, circuits, and methods are omitted so as not to obscure the description of the present invention with unnecessary detail.

The present invention relates to a process and apparatus for producing a hydrogen-containing gas. The present invention may be particularly suited for increasing the hydrogen production capacity of a reformer system.

Steam reforming is a preferred reforming process for producing a hydrogen-containing gas. In steam reforming, a hydrocarbon and steam mixture reacts in the presence of a catalyst to form hydrogen, carbon monoxide and carbon dioxide. Since the reforming reaction is strongly endothermic, heat must be supplied to the reactant mixture, e.g., by heating the reformer tubes in a furnace called a reformer FIG. 4 shows a process flow diagram for producing a hydrogen-containing gas according to the invention.

Figure 4:
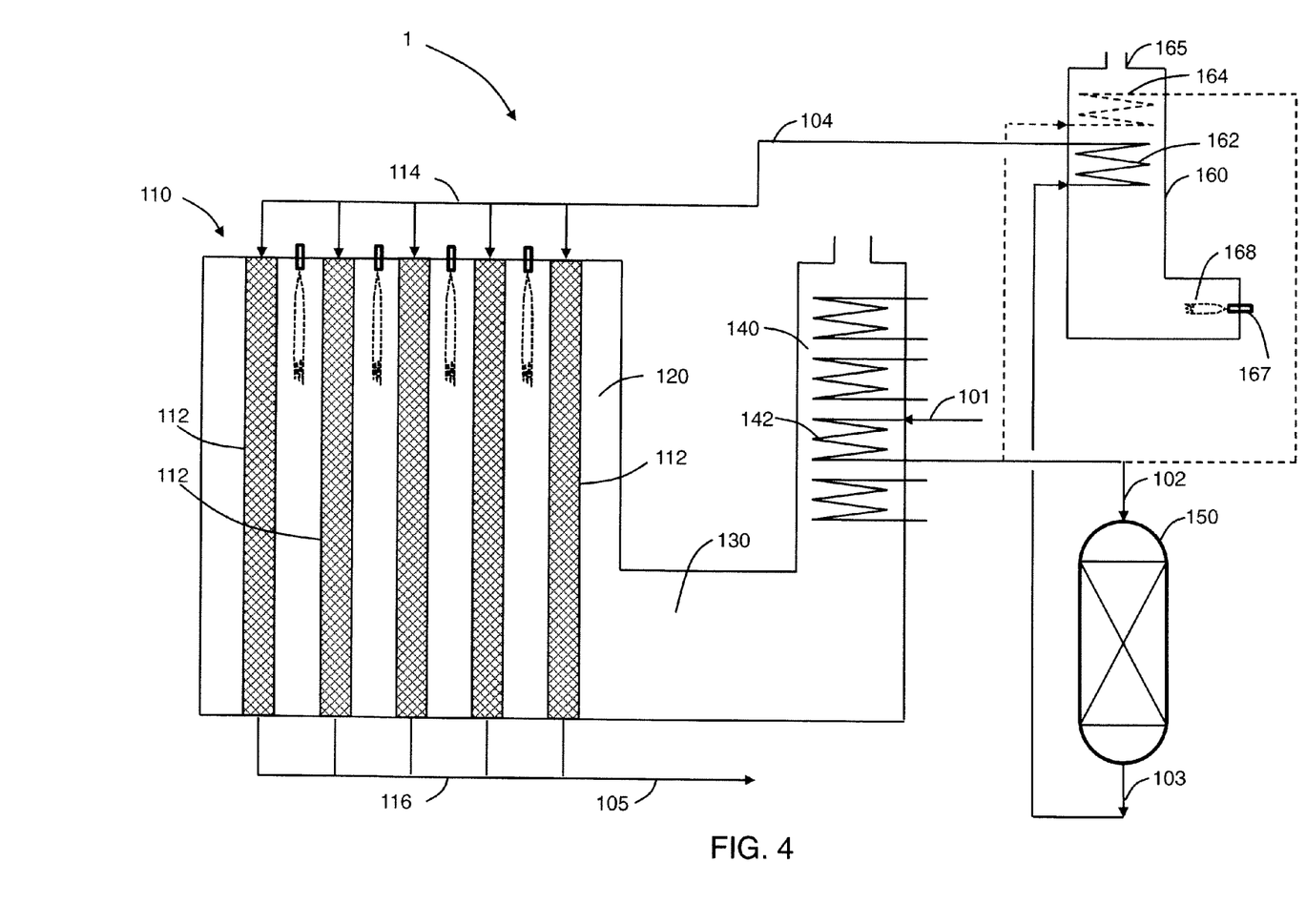
FIG. 4 illustrates a process flow diagram according to the instant invention.

The apparatus according to the invention comprises a reformer 110, an adiabatic reactor 150 and a furnace 160 as shown in FIG. 4.

The reformer 110 has a section 120 containing a plurality of reformer tubes 112. Section 120 is typically referred to as the radiant section of the reformer and may be a chamber. The process comprises combusting a first fuel and a first oxidant gas external to the reformer tubes 112 in section 120 to form a first combustion product gas mixture and heat the plurality of reformer tubes 112. Suitable burners, fuels, and oxidants are known in the art. Any suitable fuel may be used, for example natural gas, refinery off-gas, refinery fuel gas, fuel oil and the like. The oxidant gas may be air or other suitable oxidant gas containing oxygen. The oxidant gas may be preheated. The first combustion product gas mixture will comprise $CO_2$ and $H_2O$.

A "reformer tube" is any tubular reactor containing a reforming catalyst. The reformer tube may have any suitable cross section. Suitable materials of construction for reformer tubes are known. The reformer catalyst tubes may have an inside diameter of at least about 100 mm with a maximum diameter of about 200 mm, and the pressure drop through the reformer catalyst tubes may be in the range of 0.1 MPa to 0.3 MPa. The catalyst in the catalyst-filled tubes may have a substantially uniform size distribution.

A "reforming catalyst" is any catalyst that promotes the reforming reaction. Reforming catalysts include but are not limited to metallic catalysts such as such as structured or unstructured metallic catalysts, e.g., structured or unstructured nickel reforming catalysts. Suitable reforming catalysts are known in the art. Conventional steam-methane reforming and prereforming catalysts such as nickel-alumina, nickel-magnesium alumina and the noble metal catalysts can be used in steam-methane reforming embodiments of the invention. The catalyst in the reformer catalyst-filled tubes preferably has a nickel content from about 15 to about 20 weight percent and is optionally promoted with potassium.

The plurality of reformer tubes 112 is downstream of an inlet manifold 114 for distributing the process gas for reaction in the plurality of reformer tubes. The plurality of reformer tubes 112 feed an outlet manifold 116 for collecting the reformed gas mixture from the plurality of reformer tubes.

Reformer 110 may also have a section 130 for passing combustion product gases from section 120 to section 140. Section 130 is typically referred to as the transition section of the reformer and section 140 is typically referred to as the convection section. The first combustion product gas mixture may be passed through transition section 130 into convection section 140 for heating the various heat exchange tubes contained therein.

"Reformers" used in the processes of the invention include but are not limited to conventional steam methane reformers and modular steam reformers, including Modular Partition Reformers (MPR's) such as those described in commonly-owned U.S. Pat. No. 6,793,700 ('700 patent) and U.S. patent application Ser. No. 10/746,577, the complete disclosures of which are hereby incorporated by reference.

One embodiment of a MPR that is disclosed in the '700 patent and that can be used in processes of the invention includes: a combustion chamber, a convection chamber in fluid flow communication with the combustion chamber, at least one burner disposed in the combustion chamber, and a reaction chamber. The combustion chamber has a first end and a second end opposite the first end. The convection chamber has a first end and a second opposite the first end, the first end of the convection chamber being adjacent the second end of the combustion chamber. The at least one burner is disposed in the combustion chamber and is adapted to combust a fuel, thereby generating a flow of a flue gas from the combustion chamber to the convection chamber, the flue gas having a sensible heat. The reaction chamber has a first part and a second part in fluid communication with the first part. A substantial portion of the first part is disposed in the combustion chamber and a substantial portion of the second part is disposed in the convection chamber. The second part is a tube-in-tube having an annular portion between an inner tubular portion and an outer tubular portion surrounding the inner tubular portion. The apparatus also includes a means for flowing a first mixed-feed through the first part of the reaction chamber, and a means for flowing a second mixed-feed through the annular portion of the second part of the reaction chamber counter-currently with the flow of the flue gas in the convection chamber.

MPR's disclosed in the '700 patent can combine combustion and convection chambers in one compact unit that can be built in the shop and serve as a modular unit, so that several units can be added with relatively simple connections in the field to achieve or to expand synthesis gas production capacity.

One embodiment of a MPR disclosed in U.S. patent application Ser. No. 10/746,577 which can be used in processes of the invention includes a vessel having at least one partition wall disposed in the vessel. The at least one partition wall divides the vessel into a plurality of chambers, including at least one combustion chamber and at least one convection chamber. Each of the chambers has a first end and a second end opposite the first end. At least one burner is disposed in the combustion chamber. The burner is adapted to combust a fuel, thereby generating a flue gas having sensible heat. The apparatus also includes communication means between the combustion chamber and the convection chamber whereby at least a portion of the flue gas flows from the combustion chamber to the convection chamber at a first location adjacent the first end of the convection chamber. The apparatus also includes transfer means whereby at least a portion of the flue gas flows to a second location in the convection chamber adjacent the second end of the convection chamber. The apparatus also includes multiple reaction chambers, including a first reaction chamber and a second reaction chamber. A substantial portion of the first reaction chamber is disposed in the combustion chamber, and a substantial portion of the second reaction chamber is disposed in the convection chamber.

MPR's disclosed in U.S. patent application Ser. No. 10/746,577 are in the form of a compact unit that may be built in the shop and may be used as a modular unit in a configuration where several units set side-by-side are connected with simple connections at a field site to achieve or to expand synthesis gas production capacity.

The method according to the instant invention comprises reacting a heated feed 102 in an adiabatic reactor 150 under reaction conditions sufficient to form an intermediate product gas mixture 103. Heated feed 102 comprises methane and steam. The heated feed 102 may comprise other hydrocarbons in addition to methane. The source of the methane may be any known hydrocarbon feedstock comprising methane. To prevent catalyst poisoning, the feedstock will normally be desulfurized. A "hydrocarbon feedstock" includes any hydrocarbon-containing stream which can be reacted chemically to produce a hydrogen-containing product gas. Hydrocarbon feedstocks include but are not limited to natural gases, refinery gases, fuel oils, and solid carbonaceous materials. Hydrocarbon feedstocks may comprise light hydrocarbons. A light hydrocarbon is any C1 to C7 hydrocarbon such as found in natural gas, naphtha, refinery fuel gases and refinery offgases. The heated feed 102 may comprise natural gas with steam, a mixture of vaporized naphtha with steam, a mixture of refinery offgases with steam, or combination of those hydrocarbons with steam. A feed is a heated feed if it previously experienced a heating operation or step, for example in a heat exchanger.

A heated feed containing hydrocarbons heavier than C3 may be heated to a temperature lower than heated feeds not containing the heavier hydrocarbons.

An intermediate product gas mixture comprises hydrogen, carbon monoxide, carbon dioxide, and unreacted feed.

Operating conditions sufficient to form the intermediate product gas mixture 103 include an inlet temperature of the heated feed 102 in the range of 400° C. to 565° C. and a pressure in the adiabatic reactor 150 in the range of 0.7 MPa to 4.3 MPa.

Adiabatic reactor 150 contains a reforming catalyst and has an inlet and an outlet. Adiabatic reactor 150 may be referred to as a prereformer. Reforming catalyst used in a prereformer is sometimes called prereforming catalyst.

In this disclosure, an adiabatic reactor is defined as a reactor having substantially no heat added or removed. An adiabatic reactor may have normal cooling losses typically associated with such reactors. Substantially no heat added or removed means that any heating or cooling, if provided, would alter the outlet temperature of the process stream by less than 5° C. In an adiabatic reactor, a temperature decrease is typically observed along the length of the reactor for endothermic reactions, such as steam-methane reforming where natural gas is the hydrocarbon feedstock.

Reforming catalysts used in reformer tubes 112 and adiabatic reactor 150 may be the same catalyst or a different catalyst.

The process further comprises combusting a second fuel and a second oxidant gas in a furnace 160 thereby forming a flame 168 and generating a second combustion product gas mixture. Any suitable fuel may be used, for example natural gas, refinery off-gas, refinery fuel gas, fuel oil and the like. The oxidant gas may be air or other suitable oxidant gas containing oxygen. The oxidant gas may be preheated. The second combustion product gas mixture will comprise $CO_2$ and $H_2O$. The fuel combusted in the furnace may have the same composition and come from the same source as the fuel combusted in the reformer. The fuel combusted in the furnace may have a different composition than the fuel combusted in the reformer. The oxidant gas used in the furnace may have the same composition and come from the same source as the oxidant gas used in the reformer. The oxidant gas used in the furnace may have a different composition than the oxidant gas used in the reformer.

A furnace is any enclosed structure in which heat is produced by combustion of a fuel. As used herein, a furnace does not comprise a gas turbine.

The furnace may be characterized by a combustion section where the flame is generated and a convection section where hot combustion product gases, also called flue gases, are passed over a heat exchange tube.

Furnace 160 has a burner 167 for introducing a fuel and an oxidant gas into the furnace and an exhaust 165 for withdrawing products of combustion. The burner may be selected from any suitable commercially available burners. One or more burners may be used.

The furnace 160 may have a convection section containing rows of convection coils configured in a split design, with the first several rows of the coils arranged to channel the second combustion product gas mixture co-currently with the intermediate product gas mixture to reduce the coil's metal peak temperatures.

The furnace 160 may be relatively small compared to the reformer and may have a substantially smaller heat duty compared to the reformer.

The process further comprises heating the intermediate product gas mixture 103 in furnace 160 to form a heated intermediate product gas mixture 104. The intermediate product gas mixture 103 may be heated from about 370° C. to a temperature of about 700° C. in the furnace 160, or heated from about 400° C.-500° C. to a temperature of about 680° C. Heated intermediate product gas mixture 104 may be characterized by a first temperature ranging from 600° C. to 700° C. or ranging from 650° C. to 700° C. or ranging from 680° C. to 700° C. The intermediate product gas mixture 103 is heated by indirect heat transfer between the second combustion product gas mixture and the intermediate product gas mixture 103.

In "indirect heat transfer," heat is transferred between two fluids without mixing the two fluids together, as in shell and tube heat exchangers.

Furnace 160 contains a heat exchange tube 162 which has an inlet and an outlet. Heat exchange tubes are commonly referred to as heating coils or coils, in the art. Heat exchange tubes are any conduits for providing indirect heat transfer between a fluid outside the heat exchange tube and a fluid within the heat exchange tube. In the step of heating the intermediate product gas mixture 103, the intermediate product gas mixture may be heated in a heat exchange tube 162 in the furnace 160. Heat exchange tube 162 may be located in furnace 160 to preclude direct radiation from a flame 168 generated by burner 167 or to preclude direct radiation from any flames generated in the furnace. Precluding direct radiation from flame 168 facilitates substantially uniform heating of the heat exchange tube 162 with no local overheating of the heat exchange tube 162 and helps to prevent carbon formation in the heat exchange tube 162.

The inlet of the heat exchange tube 162 is in downstream fluid flow communication with the outlet of adiabatic reactor 150. The outlet of the heat exchange tube 162 is in upstream fluid flow communication with the inlet manifold 114 of the reformer tubes 112.

As used herein, "in fluid flow communication" means operatively connected by one or more conduits, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

Downstream and upstream refer to the intended flow direction of a process fluid.

The temperature of the combustion products in the furnace 160 may be controlled by varying the number of burners and/or firing rate of burner 167. The oxidant gas may be provided in an amount 180% to about 280% of the stoichiometric amount required for complete combustion of the fuel. Alternatively stated, the second fuel and the second oxidant gas may be introduced into the furnace with a stoichiometric ratio, S, of 1.8 to 2.8.

The stoichiometric ratio is defined as the actual air (or other oxidant gas)/fuel ratio divided by theoretically correct air (or other oxidant gas)/fuel ratio. For example for natural gas combustion, theoretically correct air/fuel ratio is approximately 10. For any fuel, if the furnace is operating at theoretically correct amount of oxidant, the value of S=1. For the fuel-rich operation, the value of S<1 and conversely, for fuel-lean operation, the value of S>1. For combustion of methane with pure oxygen, the theoretically correct amount of oxidant to fuel ratio is 2:1. A stoichiometric ratio of 1.8 corresponds to an actual oxidant gas to fuel ratio of 3.6:1.

While operating a furnace with such high stoichiometric ratio decreases the furnace energy efficiency, such an operation of the furnace provides substantial temperature control of the combustion product gas temperature in proximity to the heat exchange tube 162. The temperature of the combustion product gas in proximity to the heat exchange tube in the convection section may be held slightly above temperature needed for the feed to the reformer tubes.

Generating a combustion product gas in the furnace with excess oxidant (air) eliminates high temperature gradients between the combustion product gas and the intermediate product gas mixture and minimizes the temperature difference between the heated intermediate product gas mixture and the maximum temperature of the heat exchanger tube. This decreases the risk of carbon formation in the heat exchanger tube and enables a higher temperature of the heated intermediate product gas mixture, which is suitable for introducing into the reformer tubes.

Combustion in the furnace may be adjusted to vary the temperature of the heated intermediate product gas mixture leaving the furnace, for example in response to variations in process conditions and/or product demand. A lower temperature may be desired if the production rate from the reformer is reduced and a higher temperature may be desired for higher hydrogen-containing gas production rates.

The process comprises reacting the heated intermediate product gas mixture 104 in the plurality of reformer tubes 112 under reaction conditions sufficient to form the hydrogen-containing gas 105. The heated intermediate product gas mixture may be introduced into the plurality of reformer tubes 112 at a temperature within 10° C. of the first temperature or at the first temperature.

Reaction conditions sufficient to form the hydrogen-containing gas include a temperature in the range of 790° C. to 930° C. and a pressure in the range of 0.7 MPa to 4.3 MPa. The temperature of the gas leaving the catalyst in the reforming tubes can affect the amount of reforming achieved or extent of reaction.

"Hydrogen-containing gas" is produced in the plurality of reformer tubes by reforming a hydrocarbon feedstock, as defined above. Hydrogen-containing gas (e.g., synthesis gas) produced by the present process may be separated to yield a substantially pure hydrogen product by separation apparatuses and processes that are well-known to those of ordinary skill in the art.

The process is characterized in that the step of heating the intermediate product gas mixture 103 does not comprise indirectly transferring heat between the first combustion product gas mixture and the intermediate product gas mixture 103. Heat from the combustion products formed in the reformer is not used to heat the intermediate gas mixture 103.

The heated intermediate product gas mixture 103 might not be further heated at all between the step of heating the intermediate product gas mixture in the furnace and the step of reacting the heat intermediate product gas mixture in the plurality of reformer tubes.

The apparatus is characterized by having no intervening heat exchanger between the outlet of the heat exchange tube 162 and the inlet manifold 114 of the reformer tubes 112.

The benefit of providing heating in a separate furnace, without heating using the combustion products from the reformer are more uniform temperature control of the heated intermediate product gas mixture to the reformer tubes, no impact on the heating of other process streams in the reformer convection section, and no carbon formation when heating the intermediate product gas mixture.

Another benefit of providing heating in a separate furnace is that the rate of production of hydrogen-containing gas can be varied in a matter of hours.

Another benefit of providing heating in a separate furnace is that when the furnace is taken off-line, e.g. for servicing, the intermediate product gas mixture may be feed directly to the plurality of reformer tubes, thereby avoiding a complete shutdown of the reformer system.

The process may further comprise heating feed 101 comprising a hydrocarbon feedstock and steam to form heated feed 102.

Feed 101 may be heated in section 140 of the reformer 110 as shown in FIG. 4. Heat may be transferred by indirect heat transfer with the first combustion product gas mixture from section 120 of reformer 110 in heat exchange tube 142.

Feed 101 may be further heated in heat exchange tube 164 in furnace 160 as shown by the dashed lines in FIG. 4.

Feed stream 101 may be heated in heat exchange tube 142 by indirect heat transfer from the first combustion product gas mixture and a portion or all subsequently heated in heat exchange tube 164 by indirect heat transfer from the second combustion product gas mixture.

The first oxidant gas i.e. the oxidant for the reformer 110, may be heated by indirect heat transfer in heat exchange tubes (not shown) in furnace 160.

The present invention may facilitate the expansion of the hydrogen-containing gas capacity of an existing reformer and/or an associated plant from about 25% to about 60% without disrupting the output or energy balance of either the reformer or any associated plant. The invention may be implemented without constraints imposed by the reformer convection section size or heat exchange tube configuration.

The invention is illustrated further in the following non-limiting example.

EXAMPLE 1

The process according to the invention was modeled based on the use of furnace which heats an intermediate product gas mixture from an adiabatic reactor to a temperature of about 650° C. Results are summarized in Table 1 below.

The furnace was configured with a separate combustion chamber which operated on natural gas fuel with an excess air of 130% above stoichiometry, corresponding to a stoichiometric ratio of 1.3. This also corresponds to 11.2% (wet) oxygen in the furnace flue gas. A heat exchanger tube, in the form of a heating coil, was located in the furnace convective section and was not exposed directly to the flame in the furnace combustion chamber.

The temperature of the combustion product gas mixture at the coil inlet was about 990° C. Nine rows of heating coils having 2" diameter were used.

The first two rows of tubes were configured in a co-current arrangement of the process gas with the combustion product gas mixture flue gas flow to reduce peak temperatures. The remaining seven rows were configured in a counter-current arrangement of the process gas with the combustion product gas mixture. The inner gas film temperature at the first and hottest tube row of the coil was about 690° C., which ensures than no carbon formation occurs on the internal heat exchange surface. The corresponding maximum (peak) metal temperature was about 733° C. and the bulk gas temperature at the first row exit was about 505° C. The first five rows of the coil were designed based on the use of bare tubes. Finned tubes were used for the last four rows of the coil to extend surface area at the part of the coil with lower flue gas temperatures.

TABLE 1

PREREFORMER 150 EFFLUENT STREAM
(Inlet to heat exchange tube 162)

| COMPONENTS | COMPOSITION | |
|---|---|---|
| | kmol/hr | % mol. |
| $H_2$ | 21.42 | 7.9% |
| $CH_4$ | 59.11 | 21.8% |
| CO | 0.11 | 0.0% |
| $CO_2$ | 6.79 | 2.5% |
| $N_2$ | 0.25 | 0.1% |
| $H_2O$ | 183.17 | 67.6% |
| TOTAL | 270.84 | 100.0% |
| Pressure, Bara | 24.6 | |
| Temperature ° C. | 453 | |

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

We claim:

1. A process for producing a hydrogen-containing gas, the process comprising:
    combusting a first fuel and a first oxidant gas external to a plurality of reformer tubes in a first section of a reformer to form a first combustion product gas mixture and heat the plurality of reformer tubes;
    reacting a heated feed comprising methane and steam in an adiabatic reactor containing a reforming catalyst under reaction conditions sufficient to form an intermediate product gas mixture;
    combusting a second fuel and a second oxidant gas in a furnace thereby forming a flame and generating a second combustion product gas mixture;
    heating the intermediate product gas mixture in a heat exchange tube in the furnace to form a heated intermediate product gas mixture by indirectly transferring heat between the second combustion product gas mixture and the intermediate product gas mixture wherein heat is not transferred to the heat exchange tube by direct radiation from the flame; and
    reacting the heated intermediate product gas mixture in the plurality of reformer tubes under reaction conditions sufficient to form the hydrogen-containing gas;
    wherein the step of heating the intermediate product gas mixture does not comprise indirectly transferring heat between the first combustion product gas mixture and the intermediate product gas mixture.

2. The process of claim 1 wherein the heated intermediate product gas mixture is not further heated between the step of heating the intermediate product gas mixture in the furnace and the step of reacting the heated intermediate product gas mixture in the plurality of reformer tubes.

3. The process of claim 1 further comprising heating a feed by indirect heat transfer from the first combustion product gas mixture to the feed thereby forming the heated feed.

4. The process of claim 1 further comprising heating a feed by indirect heat transfer from the first combustion product gas mixture and subsequently by indirect heat transfer from the second combustion product gas mixture thereby forming the heated feed.

5. The process of claim 1 wherein the second fuel and the second oxidant gas are introduced into the furnace with a stoichiometric ratio, S, of 1.8 to 2.8.

6. The process of claim 1 wherein the heated intermediate product gas mixture has a temperature ranging from 600° C. to 700° C.

7. The process of claim 1 wherein the heated intermediate product gas mixture has a temperature ranging from 680° C. to 700° C.

8. An apparatus for producing a hydrogen-containing gas, the apparatus comprising:
    a reformer having a first section containing reformer tubes, the reformer tubes in downstream fluid flow communication of an inlet manifold, the reformer tubes feeding an outlet manifold;
    an adiabatic reactor containing a reforming catalyst, the adiabatic reactor having an inlet and an outlet; and
    a furnace having a burner and an exhaust, the furnace containing a first heat exchange tube having an inlet and an outlet, the inlet of the first heat exchange tube in downstream fluid flow communication with the outlet of the adiabatic reactor and the outlet of the first heat exchange tube in upstream fluid flow communication with the inlet manifold of the reformer tubes wherein the first heat exchange tube is located in the furnace to preclude direct radiation from a flame generated by the burner; and
    wherein there is no intervening heat exchanger between the outlet of the first heat exchange tube and the inlet manifold.

9. The apparatus of claim 8 wherein the reformer has a second section containing a second heat exchange tube, the second heat exchange tube having an inlet and an outlet, wherein the inlet of the adiabatic reactor is in downstream fluid flow communication with the outlet of the second heat exchange tube.

10. The apparatus of claim 9 wherein the furnace contains a third heat exchange tube having an inlet and an outlet, wherein the inlet of the third heat exchange tube is in downstream fluid flow communication with the outlet of the second heat exchange tube and wherein the inlet of the adiabatic reactor is in downstream fluid flow communication with the outlet of the third heat exchange tube.

* * * * *